US006657421B1

(12) United States Patent
Pastor et al.

(10) Patent No.: US 6,657,421 B1

(45) Date of Patent: Dec. 2, 2003

(54) VOLTAGE VARIABLE CAPACITOR WITH IMPROVED C-V LINEARITY

(75) Inventors: Rickey G. Pastor, Bolingbrook, IL (US); Lei Zhao, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1 day.

(21) Appl. No.: 10/185,289

(22) Filed: Jun. 28, 2002

(51) Int. Cl.$^7$ ............................ G05F 5/00; H04M 1/00

(52) U.S. Cl. ......................... 323/303; 455/550; 377/95

(58) Field of Search ................................ 323/303, 304, 323/310; 455/550, 572, 574, 575; 330/56, 57, 59; 377/95

(56) References Cited

U.S. PATENT DOCUMENTS

| | | | | | |
|---|---|---|---|---|---|
| 3,013,201 | A | * | 1/1961 | Goldie | 310/309 |
| 3,123,723 | A | * | 3/1964 | Wieder | 377/95 |
| 3,693,110 | A | * | 9/1972 | Briggs, Jr. et al. | 331/47 |
| 3,924,209 | A | * | 12/1975 | Valdettaro | 334/39 |
| 4,833,419 | A | * | 5/1989 | Chrystie | 330/59 |
| 6,339,711 | B1 | * | 1/2002 | Otaka et al. | 455/550 |

* cited by examiner

*Primary Examiner*—Rajnikant B. Patel

(74) *Attorney, Agent, or Firm*—William E. Koch

(57) ABSTRACT

An electronic control circuit for a voltage variable capacitor, the electronic control circuit comprising a plurality of voltage variable capacitors, a plurality of resistors, and a plurality of variable electrical power sources wherein the plurality of voltage variable capacitors, the plurality of resistors, and the plurality of variable electrical power sources are electrically interconnected to form an electronic bias circuit for adjusting a capacitance of the plurality of voltage variable capacitors.

20 Claims, 1 Drawing Sheet

5

VOLTAGE VARIABLE CAPACITOR WITH IMPROVED C-V LINEARITY

FIELD OF THE INVENTION

The present invention relates to voltage variable capacitors and, more particularly, to voltage variable capacitors with improved C-V linearity.

BACKGROUND OF THE INVENTION

Voltage variable capacitors (hereinafter referred to as "VVC's") offer major performance advantages over PIN diodes in impedance matching applications wherein a drain current can be three orders of magnitude less for a VVC than for a PIN diode. Further, VVC's offer the possibility of continuous impedance tuning with a substantially reduced component count.

As is known in the art, VVC's are typically formed using standard semiconductor processes and techniques. In general, a semiconductive layer is formed on a semiconductor substrate by forming a doped layer on the surface of the substrate. An insulating layer is then formed on the surface of the doped layer and a pair of radio frequency (hereinafter referred to as "RF") capacitors are formed by depositing two spaced apart metal contacts on the surface of the insulating layer. Each contact forms a capacitor in conjunction with the underlying semiconductive layer. The two spaced apart metal contacts are Input/Output contacts for the VVC and opposite contacts for each of the capacitors are connected together and to the back side of the substrate by the semiconductive layer.

The VVC is connected into a circuit by connecting a first variable direct current (hereinafter referred to as "DC") voltage between the back side of the substrate and one of the two spaced apart metal contacts and a second variable DC voltage between the back side of the substrate and the other of the two spaced apart metal contacts. Generally, the two variable voltages are the same and are supplied by one voltage supply. The WC has a typical S-shaped capacitor-voltage (hereinafter referred to as "C-V") waveform. The problem is that the C-V waveform has breaks or very sharp corners (i.e. $C_{min}$ and $C_{max}$) in it which produce irregularities in the inter-modulation (hereinafter referred to as "IM") performance. Also the linear portion of the curve (between $C_{min}$ and $C_{max}$) is relatively short which reduces the linearity of the VVC.

Accordingly it is highly desirable to provide an electronic circuit apparatus which overcomes or reduces these problems.

SUMMARY OF THE INVENTION

To achieve the objects and advantages specified above and others, an electronic control circuit for a voltage variable capacitor is disclosed. The electronic control circuit includes a plurality of voltage variable capacitors, a plurality of resistors, a plurality of variable electrical power sources wherein the plurality of voltage variable capacitors, the plurality of resistors, and the plurality of variable electrical power sources are electrically interconnected to form a bias circuit. The bias circuit allows the plurality of voltage variable capacitors to have a substantially linear capacitance-voltage waveform.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the following drawings.

DETAILED DESCRIPTION OF THE PREFERRED EMBODIMENT

Figure 1:
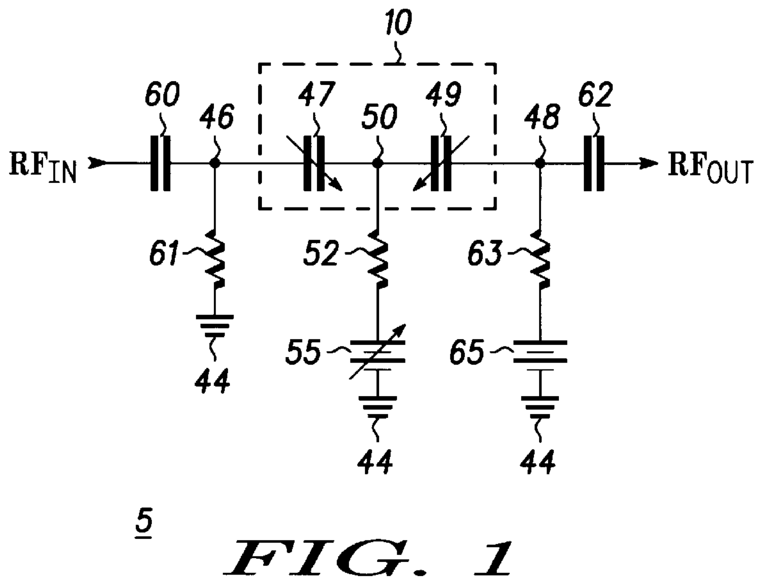
FIG. 1 is a schematic diagram of a voltage variable capacitor with an electronic control circuit in accordance with the present invention.

Turn now to FIG. 1 which illustrates an electronic bias circuit 5 for a voltage variable capacitor 10. In the preferred embodiment, bias circuit 5 is formed as an integrated circuit. However, it will be understood that bias circuit 5 can be formed as an integrated circuit, a discrete electronic circuit, or combinations thereof. In circuit 5, VVC 10 includes a voltage variable capacitor 47 and a voltage variable capacitor 49 wherein VVC 47 and VVC 49 are electrically connected at a node 50.

In the preferred embodiment, a resistor 61 is electrically connected to VVC 47 at a node 46 wherein resistor 61 is also connected to an electrical ground 44. In the preferred embodiment, resistor 61 has a value of approximately 10 KΩ. However, it will be understood that resistor 61 can have other resistance values to obtain a desired biasing for electronic control circuit 5 wherein the resistance value is approximately in the range of 5 KΩ to 15 KΩ.

In the preferred embodiment, a resistor 52 is electrically connected to VVC 47 and VVC 49 at node 50. In the preferred embodiment, resistor 52 has a value of approximately 10 KΩ. However, it will be understood that resistor 52 can have other resistance values to obtain a desired biasing for electronic control circuit 5 wherein the resistance value is approximately in the range of 5 KΩ to 15 KΩ.

In the preferred embodiment, a variable electrical power source 55 is electrically connected in series with resistor 52 wherein power source 55 is also connected to electrical ground 44. In the preferred embodiment, variable electrical power source 55 includes a variable DC voltage source. However, it will be understood that power source 55 can include other electrical power sources such a variable current source, a DC current source, a DC voltage source, or the like.

In the preferred embodiment, a resistor 63 is electrically connected to VVC 49 at a node 48. In the preferred embodiment, resistor 63 has a value of approximately 10 KΩ. However, it will be understood that resistor 63 can have other resistance values to obtain a desired biasing for electronic control circuit 5 wherein the resistance value is approximately in the range of 5 KΩ to 15 KΩ.

In the preferred embodiment, a variable electrical power source 65 is electrically connected in series with resistor 63 wherein power source 65 is also connected to electrical ground 44. In the preferred embodiment, variable electrical power source 65 includes a DC voltage source. However, it will be understood that power source 65 can include other electrical power sources such a variable current source, a DC current source, a variable DC voltage source, or the like.

In the preferred embodiment, a RF coupling capacitor 60 is electrically connected to VVC 47 and resistor 61 at node 46. Further, a RF coupling capacitor 62 is electrically connected to resistor 63 and WC 49 at node 48. RF coupling capacitor 60 is connected from an $RF_{in}$ terminal to node 46 and, similarly, RF coupling capacitor 62 is connected from an $RF_{out}$ terminal to node 48.

In a typical application, RF coupling capacitor 60 couples RF signals from a source (not shown) to node 46. The RF signals pass directly through VVC 47 and VVC 49 to node 48 and are coupled to a load (not shown) by RF coupling capacitor 62. Resistors 61, 52, and 63 essentially block RF signals from entering the DC bias circuits so that WC 47 and VVC 49 look to the RF circuit as though it is a pure capacitance.

Figure 2:
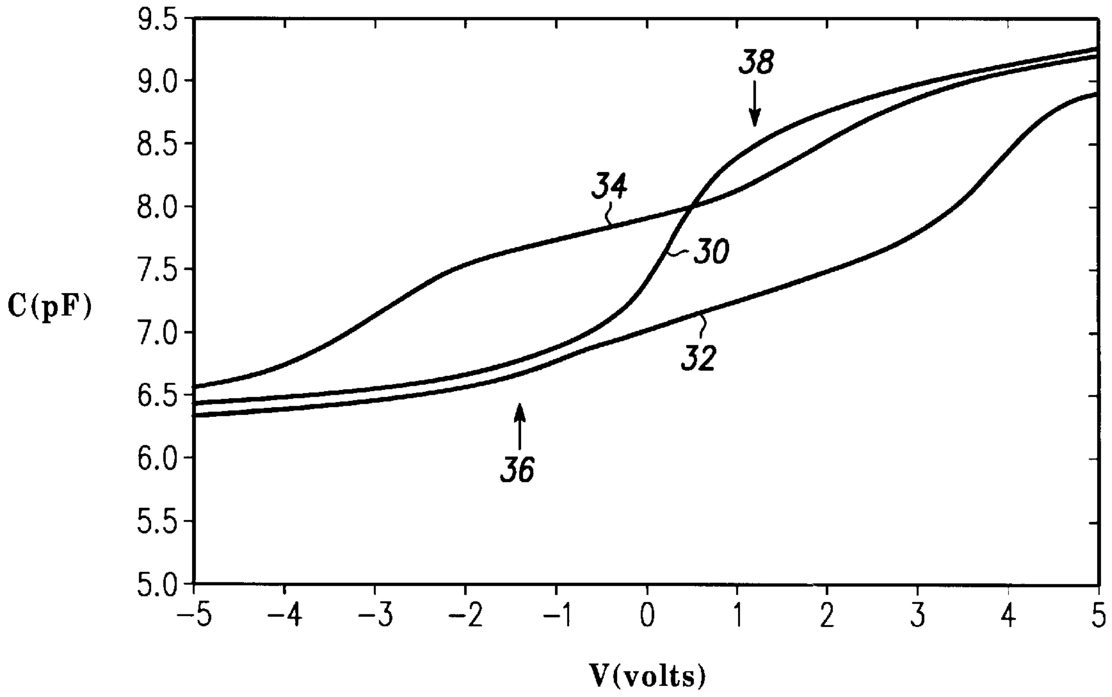
FIG. 2 is a graphical representation of the capacitor-voltage waveform of the voltage variable capacitor of FIG. 1 in accordance with the present invention.

Turn now to FIG. 2 which illustrates a plot of a capacitance vs. voltage waveform for VVC 10. In this illustration, power source 65 has a fixed voltage while the voltage of power source 55 is adjusted from negative five volts to positive five volts. Also in this illustration, three curves are generated for VVC 10. Curve 30 is obtained when power source 65 is fixed at zero volts, curve 32 is obtained when power source 65 is fixed at negative two volts, and curve 34 is obtained when power source 65 is fixed at positive two volts.

Here it will be understood that the voltage range positive five volts to negative five volts is relatively common and will be used throughout this discussion for purposes of example. However, larger or smaller ranges can be used in specific applications and it is even not uncommon to simply switch between the flat areas beyond $C_{min}$ and $C_{max}$ to produce a switching type of device.

The operation of VVC 10 is described briefly as follows. As node 50, for example, is biased negative by power source 55, electrons are attracted to a plate of capacitor 47 connected to node 46. As node 50 is biased positive by voltage source 55, electrons are repelled and a depletion area is formed adjacent to a plate of capacitor 47 connected to node 46. The number of electrons attracted or repelled is determined by the amount of bias voltage applied and determines the apparent capacitance of VVC 10. A similar result is obtained for capacitor 49 wherein a bias voltage for capacitor 49 is given by the voltage from power source 65 with the addition or subtraction of the voltage from power source 55.

Curve 30 corresponds to a typical capacitance-voltage curve wherein curve 30 is substantially non-linear. However, when power source 65 has a nonzero value, such as negative two volts (i.e. curve 32) or positive two volts (i.e. curve 34), the corresponding C-V curve is substantially linear, especially in the range from zero volts to positive three volts.

The C-V waveforms for VVC 10 show that the minimum capacitance (i.e. $C_{min}$) of VVC 10, generally denoted by break 36 in curve 30, is reached before the variable voltage is reduced to negative two volts. Similarly, the maximum capacitance (i.e. $C_{max}$) of VVC 10, generally denoted by break 38 in curve 30, is reached before the variable voltage is increased to positive two volts. Breaks 36 and 38 in the waveform produce inter-modulation (IM) problems and the flattened portions of the waveform produce control problems because additional control voltage applied to WC 10 beyond either $C_{min}$ or $C_{max}$ does not produce appreciable capacitance changes. However, as explained briefly above, it is not uncommon to simply switch between the flat areas beyond $C_{min}$ and $C_{max}$ to provide a switching action.

It should be noted that no break is present in curves 32 and 34 for VVC 10 when power source 65 is at negative two volts and positive two volts, respectively. The linear portion of the waveform extends well beyond the positive two volt and negative two volt bias points so that control of the capacitance of VVC 10 is never changed or reduced throughout the range and the range is substantially improved. Also, since there are no sharp breaks or flat areas in the waveform inter-modulation performance is improved.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is.

What is claimed is:

1. An electronic control circuit for a voltage variable capacitance, the electronic control circuit comprising:

a plurality of voltage variable capacitors;

a plurality of resistors;

a plurality of variable electrical power sources; and wherein the plurality of voltage variable capacitors, the plurality of resistors, and the plurality of variable electrical power sources are electrically interconnected to form a bias circuit.

2. A circuit as claimed in claim 1 wherein the electronic control circuit is fabricated as one of an integrated circuit, a discrete electronic circuit, and combinations thereof.

3. A circuit as claimed in claim 1 wherein at least one of the variable electrical power sources includes a direct current voltage source.

4. A circuit as claimed in claim 1 wherein at least one of the variable electrical power sources includes a variable voltage source.

5. A circuit as claimed in claim 1 wherein at least one of the variable electrical power sources includes at least one of a variable current source and a direct current source.

6. A circuit as claimed in claim 1 wherein at least one of the resistors has a resistance approximately in the range of 5 KΩ to 15 KΩ.

7. A circuit as claimed in claim 1 wherein at least one of the variable electrical power sources has a substantially constant voltage in the range of approximately negative three volts to positive three volts.

8. An electronic bias circuit for a voltage variable capacitance, the circuit comprising:

a first voltage variable capacitor with a first electrical connection and a second electrical connection;

a second voltage variable capacitor with a first electrical connection and a second electrical connection herein the first electrical connection of the second voltage variable capacitor is electrically connected to the second electrical connection of the first voltage variable capacitor;

a first resistor with a first electrical connection and a second electrical connection wherein the first electrical connection of the first resistor is electrically connected to the first electrical connection of the first voltage variable capacitor and wherein the second electrical connection of the first resistor is electrically connected to an electrical ground;

a second resistor with a first electrical connection and a second electrical connection wherein the first electrical connection of the second resistor is electrically connected to the second electrical connection of the first voltage variable capacitor;

a first variable voltage source with a first electrical connection and a second electrical connection wherein the first electrical connection of the first variable voltage source is electrically connected to the second electrical connection of the second resistor and wherein the second electrical connection of the first variable voltage source is electrically connected to the electrical ground;

a third resistor with a first electrical connection and a second electrical connection wherein the first electrical connection of the third resistor is electrically connected to the second electrical connection of the second voltage variable capacitor; and a second variable voltage source with a first electrical connection and a second electrical connection wherein the first electrical connection of the second variable voltage source is electrically connected to the second electrical connection of the third resistor and wherein the second electrical connection of the second variable voltage source is electrically connected to the electrical ground.

9. A circuit as claimed in claim 8 wherein the electronic control circuit is fabricated as one of an integrated circuit, a discrete electronic circuit, and combinations thereof.

10. A circuit as claimed in claim 8 wherein at least one of the first and the second variable voltage sources includes a direct current voltage source.

11. A circuit as claimed in claim 8 wherein at least one of the first resistor, the second resistor, and the third resistor has a resistance approximately in the range of 5 KΩ to 15 KΩ.

12. A circuit as claimed in claim 8 wherein the second variable voltage source has a substantially constant voltage in the range of approximately negative three volts to positive three volts.

13. A method of adjusting a capacitance of voltage variable capacitors, the method including:

providing a plurality of voltage variable capacitors;

providing a plurality of resistors;

providing a plurality of variable electrical power sources; and interconnecting the plurality of voltage variable capacitors, the plurality of resistors, and the plurality of variable electrical power sources to form an electronic bias circuit.

14. A method as claimed in claim 13 wherein an electrical power of at least one of the variable electrical power sources is adjusted to obtain a desired capacitance.

15. A method as claimed in claim 13 wherein the capacitance of the voltage variable capacitor is approximately linearly dependent on at least one of the variable electrical power sources.

16. A method as claimed in claim 13 including in addition the step of fabricating the electronic bias circuit as one of an integrated circuit, a discrete electronic circuit, and combinations thereof.

17. A method as claimed in claim 13 wherein at least one of the variable electrical power sources includes a direct current voltage source.

18. A method as claimed in claim 13 wherein at least one of the variable electrical power sources includes a variable voltage source.

19. A method as claimed in claim 13 wherein at least one of the variable electrical power sources includes at least one of a variable current source and a direct current source.

20. A method as claimed in claim 13 wherein at least one of the variable electrical power sources has a substantially constant voltage in the range of approximately negative three volts to positive three volts.

* * * * *